July 5, 1960 W. W. PIPER 2,944,177
ELECTROLUMINESCENT CELL AND METHOD OF MAKING THE SAME
Filed April 28, 1958
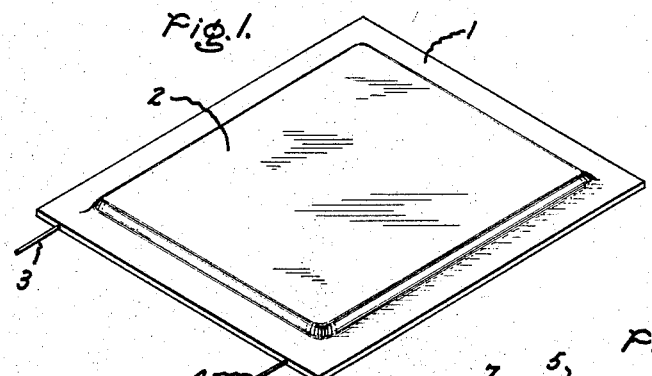
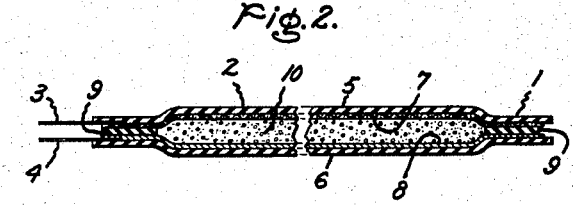
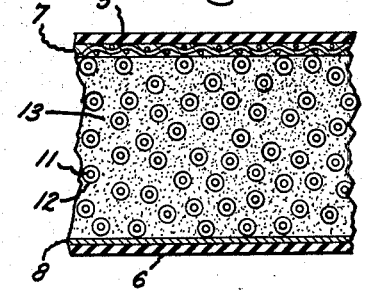
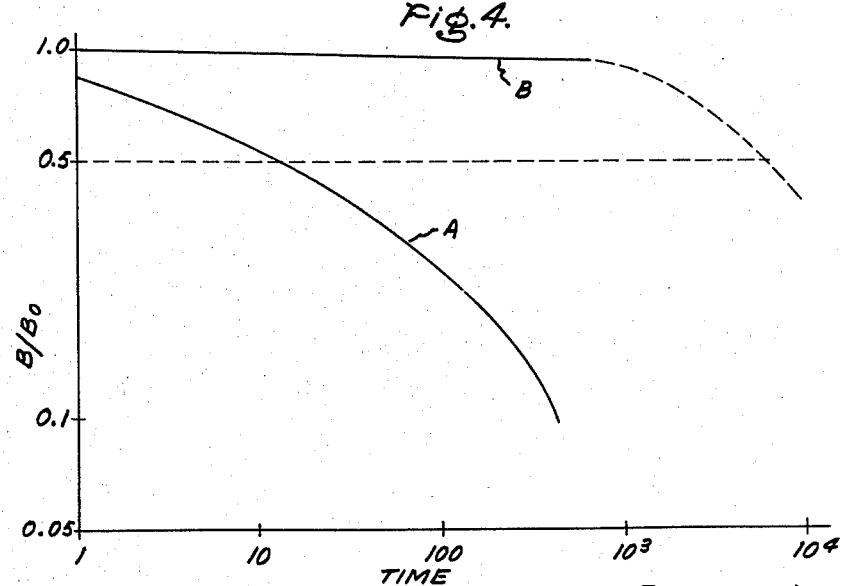
Inventor:
William W. Piper,
by Paul A. Frank
His Attorney.

United States Patent Office 2,944,177
Patented July 5, 1960

2,944,177

ELECTROLUMINESCENT CELL AND METHOD OF MAKING THE SAME

William W. Piper, Scotia, N.Y., assignor to General Electric Company, a corporation of New York Filed Apr. 28, 1958, Ser. No. 731,367

13 Claims. (Cl. 313—108)

The present invention relates to electroluminescent light sources exhibiting greatly improved maintenance characteristics and to methods of making the same.

Electroluminescent cells are light sources generally including an electroluminescent phosphor, or light emitting substance, sandwiched between a pair of juxtaposed conducting members, generally parallel, at least one of which is light transmitting. When an electrical potential is applied between the conducting members, light is produced directly from the phosphor without the generation of any large amount of heat. Many useful and efficient electroluminescent cells have been made in which the light emitting layer is composed of phosphor particles suspended in a plastic dielectric medium, or is in the form of a homogeneous crystalline phosphor layer, or as a single crystal of the phosphor. Most of these forms, however, suffer, to some extent, from the fact that atmospheric air and humidity detract greatly from phosphor efficiency. Thus, many prior art electroluminescent cells of the above types exhibit poor maintenance characteristics. That is to say, the brightness of the cells falls off very rapidly as the period of usage extends past a few hours. In many instances, the brightness of such cells falls to less than one half the initial brightness in a period as short as ten hours.

One solution to the maintenance problem has been the proposal that electroluminescent cells be constructed in the form of electroluminescent phosphor particles suspended within a non-porous glass matrix. While this expedient has greatly improved the maintenance characteristics of the resultant cells, two great advantages of electroluminescent cells, flexibility and ruggedness, must be sacrificed. Thus, for example, glass imbedded electroluminescent cells cannot be flexed or formed into any desired shape, nor can they be subjected to any more rugged applications than may any other large piece of fragile glass.

Accordingly, one object of the present invention is to provide improved electroluminescent cells which maintain high brightness for many hours of operation.

Another object of the invention is to provide electroluminescent light sources having flexibility, ruggedness, and improved maintenance characteristics.

A further object of the present invention is to provide a new and improved method for the fabrication of electroluminescent cells.

In accord with one feature of my invention, I provide electroluminescent cells having flexibility, ruggedness, and good maintenance characteristics, and including a mass of electroluminescent particles, which are imbedded in small discrete particles of glass. The glass particles are suspended in a layer of dielectric which is contacted with a pair of conducting layers, at least one of which is light transmitting. Preferably, both dielectric and conductors are flexible to form a highly flexible cell.

Cells as described above are fabricated by intimately mixing together particles of a suitably ground phosphor and a suitably ground glass, fusing the mixed particles, solidifying the fused mass, breaking and grinding the solidified mass, incorporating the ground particles into a suitable dielectric binder, and suspending the phosphor-containing binder between conducting electrodes, at least one of which is light transmitting.

The novel features believed characteristic of the present invention are set forth in the appended claims. The invention itself, together with further objects and advantages thereof, may best be understood with reference to the following description, taken in connection with the appended drawing in which:

Fig. 1 is a perspective view of an electroluminescent light source constructed in accord with the present invention, Fig. 2 is a vertical cross sectional view of the device illustrated in Fig. 1, Fig. 3 is an enlarged cross sectional view of a portion of the view illustrated in Fig. 2, and Fig. 4 is a graphical presentation of the improved characteristics attained from devices constructed in accord with the present invention.

In Fig. 1, an electroluminescent cell constructed in accord with the present invention includes a flexible light transmitting sheet 1 having therein a central light emitting portion 2 and a pair of conducting electrode strips 3 and 4 connected thereto.

In Fig. 2 there is illustrated a vertical cross sectional view of the device illustrated in Fig. 1. In Fig. 2, the electroluminescent cell includes a flexible body including light-transmitting flexible layer 5 on one side thereof and a similar layer 6 on the opposite side thereof. Interior of layers 5 and 6 are located a pair of layers 7 and 8 of a light-transmitting, electrically conductive material. In practice, only one of layers 7 and 8 need be light transmitting. The remainder may be metal foil or metalized plastic. A thin strip 9 which may conveniently be constructed of the same material that constitutes layers 5 and 6 extends around the peripheral region 1 of the cell, is hermetically sealed therewith, and electrically isolates conducting layers 7 and 8 from one another. A pair of conducting electrode members 3 and 4 are sealed between conducting layers 7 and 8 and a respective contiguous insulating member in contact therewith.

The material constituting flexible light-transmitting layers 5 and 6 may conveniently be any suitable durable plastic or organic material having these characteristics such as polyethylene terephthalate (Mylar), polychlorotrifluoroethylene (Kel-F), and so forth. Conductive layers 7 and 8 may conveniently be a pressed matrix of silicate glass fibers coated with a thin film of indium oxide as more fully disclosed in Patent No. 2,774,004, Jaffe. Lead contacts 3 and 4 may conveniently be prepared from thin strips of copper, aluminum, or many other suitable metallic conductors. An electroluminescent light-emitting phosphor is contained within the region approximating region 2 in Fig. 1 of the drawing and is the light emitting media for the electroluminescent cell.

While the foregoing sets forth certain arrangements for electroluminescent cells constructed in accord with the invention, and certain materials which may be used, the invention may include many variations, such as for example, the structure taught in Jaffe Patent No. 2,774,004 and the copending prior art application of Fridrich and Dell, Serial No. 701,906, filed December 10, 1957, and assigned to the assignee of the present invention. In the illustrated embodiment, the invention includes the use of the flexible conducting glass paper and a pair of flexible plastic sealing members in order to gain flexibility. As utilized herein, a "flexible material" connotes one which may be repeatedly, non-destructively flexed and returned to its original shape without permanent distortion.

Additionally, although the structure illustrated in Figs. 1 and 2 illustrates the situation in which a pair of reasonably moisture resistant layers 5 and 6 are used, and are sealed at the edges to present a completely encapsulated device, the edge sealing is not necessary. Thus, due to the separate encapsulation of the phosphor particles, a moisture pervious material may comprise layers 5 and 6, and edge sealing need not be required.

In Fig. 3 of the drawing, there is illustrated a greatly enlarged cross sectional view of a portion of the device illustrated in Fig. 1. In Fig. 3 flexible light-transmitting layers 5 and 6 and flexible light transmitting conducting layers 7 and 8 are, as illustrated in Fig. 2. Light generating electroluminescent phosphor layer 10 is composed of a plurality of phosphor grains 11, which are enclosed in small globules 12 of glass. The entire matrix of glass-enclosed particles is suspended in a suitable dielectric binder 13. It will be appreciated that the representation of Fig. 3 is schematic and dimensions and proportions are not intended to be exact. The use of discrete glass particles permits the advantage of all-glass enclosed phosphors (moisture resistance) but adds the advantage of flexibility and ruggedness.

Electroluminescent phosphors 11 may be any known electroluminescent phosphor which is operative to emit visible light when subjected to an applied electric field either alternating or unidirectional. Such phosphors include members of the zinc-cadmium sulfo-selenide family including zinc sulfide, zinc selenide, cadmium sulfide, cadmium selenide, or solid solutions of one or more of these materials in one another. Likewise, these materials also include zinc oxide. Electroluminescent phosphors constituting particles 11 should also include an activator quantity (an appropriate amount sufficient to induce electroluminescent characteristics) of any of the known electroluminescent activators such as copper, lead, and manganese. I prefer, however, to utilize, as the material constituting phosphor particles 11, zinc sulfide activated with approximately 0.01 to 0.5 weight percent of copper or zinc sulfide activated with 0.1 to 5 weight percent of manganese.

The glass constituting glass globules 12 which surround the electroluminescent phosphor particles 11 may be any suitable moisture-impervious glass having a melting or fusion point sufficiently low that the glass may be fused to cause the formation of all-glass envelopes about the phosphor particles without causing a chemical reaction between the phosphor and the constituents of the glass. As a practical consideration therefore, the glass should have a fusion point of lower than 700° C., preferably lower than 600° C. While the constituents of glass which satisfy these characteristics are many and varied, suitable glasses have been fabricated utilizing weight percentages of the following constituents:

| Compound: | Weight percent |
|---|---|
| $B_2O_3$ | 28–45 |
| $Sb_2O_3$ | 10–25 |
| $SiO_2$ | 10–25 |
| ZnO | 10–20 |
| $Na_2O$ / NaF | 9–15 |
| $Al_2O_3$ | 0–5 |
| $TiO_2$ | 0–4 |

While glasses having the above constituents in the indicated ranges have been found to be quite suitable in fabricating electroluminescent cells in accord with the present invention, it should be appreciated that many other glasses may be utilized as well, and that the above list of constituents is exemplary rather than limiting. No claim is herein made to the above-disclosed glass compositions per se which are disclosed and claimed in the application of F. J. Shonebarger, Serial No. 619,161, filed October 30, 1956, and assigned to the assignee of the present invention.

Dielectric binding material 13 which, in the preferred embodiment, is utilized to form a flexible matrix for glass particles 12 may comprise any suitable high dielectric strength, flexible, organic material such as plasticized cyanoethyl cellulose, plasticized nitrocellulose, or a plasticized epoxy resin. In addition to the layer containing the glass particles, it is within the contemplation of the invention that the light output of the electroluminescent cell may be increased by adding to the layer containing the electroluminescent, glass-enclosed particles, a second layer of an extremely high dielectric constant material such as, for example, powdered barium titanate, also suspended in a suitable flexible dielectric binder. Conveniently, the barium titanate and the phosphor containing glass particles may be suspended in different lamina of the same dielectric binding material. At any rate, when the phrase "layer of dielectric binder" and similar phrases are utilized herein, it should be understood that these phrases are intended to connote not only the case in which the dielectric binder contains only the glass enclosed phosphor particles, but also the case in which the dielectric contains an additional lamina of a high dielectric material such as barium titanate as well.

In the illustrated embodiment, my invention utilizes flexible materials for binder 13 and layers 5 and 6 which, in effect, form a hermetically sealed envelope about the light emitting body of the electroluminescent cell. It is, nevertheless, within the scope of the present invention, that one or more of these materials may be rigid rather than flexible. Thus, for example, one of layers 5 or 6 may be dispensed with, and a rigid metallic plate substituted therefor. Furthermore, a rigid dielectric binder may be utilized. In this instance, the feature of flexibility of the electroluminescent cell is lost, however, the features of ruggedness and improved maintenance characteristics are retained. Still further, complete encapsulation of the dielectric is not necessary due to the use of a moisture impervious glass.

Electroluminescent cells as illustrated in the drawing and described above may be constructed substantially as follows:

A suitable glass as, for example, any of these set forth hereinbefore, for example, glass number E1–75 of Shonebarger composed of 29.2% $B_2O_3$, 20% $Sb_2O_3$, 20% $SiO_2$, 17% ZnO, 5% $Na_2O$, 7.8% NaF, 2% $Al_2O_3$ is intimately mixed in a volume ratio of 2 parts glass to 1 part phosphor with electroluminescent phosphor particles as, for example, zinc sulfide activated with 0.3 weight percent of copper. Actually, the volumetric ratio of glass and phosphor is not critical and may conveniently vary from 5 parts phosphor and 1 part glass to 1 part phosphor and 10 parts glass. Each of the phosphor and glass should have been ground or ball-milled until the major part of each is in particles of 10 microns or less. The mixed phosphor and glass particles are then heated in a suitable non-reactive crucible which may, for example, be composed of boron nitride, until the glass fuses (in this instance approximately 530° C.) and wets the phosphor particles. The crucible is then allowed to cool and the glass phosphor agglomerate is allowed to solidify. The atmosphere within which the glass and phosphor are heated and solidified is not critical and, in this instance, was atmospheric air, although the process may be practiced in vacuuo, in nitrogen, helium, or another suitable atmosphere, such as, an inert gas or nitrogen. After the phosphor and glass agglomerate has cooled, it is removed from the crucible and crushed, rolled and ground as, for example, with a mortar and pestal or a ball-mill until the particles are less than 100 microns in diameter. Although in Fig. 3, each particle is illustrated as having only one phosphor particle, it will be appreciated that some glass particles will have many phosphor particles therein.

The phosphor particles encapsulated in glass are then segregated according to particle size. A preselected range of average dimensions between 25 and 100 microns as, for example, those which will pass a 250 mesh screen but not a 300 mesh screen (approximately 50 to 57 microns) or those which will pass a 300 mesh screen but not a 325 mesh screen (44 to 50 microns in dimension) is segregated. The segregation of glass pellets according to size is important. By utilizing like-sized pellets, it is assured that cells will be uniformly bright, although useful cells may be formed without such segregation. The preselected phosphor particles are then intermixed with a suitable high dielectric strength binder, as for example, Epon epoxy resin, No. 828, available from Shell Oil Company or plasticized cyanoethyl cellulose, in a volumetric ratio which may conveniently be approximately 1 part phosphor by volume to 4 parts binder. The dielectric binder containing the glass encased phosphor particles is then spread between the conducting layers which are, in turn, sealed together to form the structure illustrated in Figs. 1–3 of the drawing. The exact details of the assembly of the dielectric into the cell are generally well known to those skilled in the art and need not be discussed herein. In addition to other well known methods, the method of assembly disclosed and claimed in the aforementioned Fridrich and Dell application is particularly useful.

In Fig. 4 of the drawing there is illustrated in graphical form the comparative maintenance characteristic of an electroluminescent cell constructed in accord with the present invention as compared with an electroluminescent cell of the prior art. In Fig. 3, curve A represents a prior art cell approximately 0.5 square inch in area and 0.003 inch thick including ZnS : 0.3 Cu phosphor imbedded in Epon 828 epoxy resin without glass enclosure or edge sealing. Curve B, on the other hand, represents a 0.5 square inch area cell 0.005 inch thick having 44 to 50 micron particles of glass (E1-75) embedded phosphor (ZnS : 0.3 Cu) suspended in Epon 828 epoxy resin without edge sealing. Both curves are a plot of the ratio of cell brightness to initial cell brightness, as a function of time, and truly represents the maintenance characteristics of the cells as a function of time. As may be seen from the curves of Fig. 4, electroluminescent cell A falls to a value of approximately one half its original brightness in approximately 14 hours, while the cell of curve B, constructed in accord with the present invention, still maintained a brightness value of approximately 0.91 its original brightness at approximately 800 hours of operation. It may be readily seen therefore, that electroluminescent cells constructed in accord with the present invention, wherein the phosphor particles are encapsulated in suitable glass pellets, and the glass pellets are then suspended within a suitable dielectric binder, exhibit greatly improved maintenance characteristics over electroluminescent cells of the prior art.

While the invention has been set forth with respect to specific embodiments, many modifications and changes will immediately occur to those skilled in the art. Accordingly, I intend, by the appended claims, to cover all such modifications and changes as fall within the true spirit and scope of the invention.

What I claim as new and desire to secure by Letters Patent of the United States is:

1. An electroluminescent cell exhibiting improved maintenance characteristics and comprising; a layer of non-vitreous dielectric material having suspended therein a plurality of discrete spaced glass particles containing particles of an electroluminescent phosphor; and a pair of electrically conductive layers, one of which is light transmissive, contacting different surface portions of said dielectric layer.

2. An electroluminescent cell exhibiting improved maintenance characteristics and comprising; a layer of flexible dielectric material having suspended therein a plurality of discrete spaced glass particles containing particles of an electroluminescent phosphor; and a pair of flexible electrically conductive layers, one of which is light transmissive contacting different surface portions of said dielectric layer.

3. An electroluminescent cell exhibiting improved maintenance characteristics and comprising; a layer of flexible dielectric material having suspended therein a plurality of spaced glass particles containing particles of an electroluminescent phosphor; a pair of flexible, electrically conductive layers, one of which is light-transmissive contacting different surfaces of said dielectric layer, and a pair of flexible electrically insulating layers overlying said conductive layers.

4. An electroluminescent cell exhibiting improved maintenance characteristics and comprising; a layer of non-vitreous dielectric material having suspended therein a plurality of discrete spaced glass particles of 25 to 100 microns in dimension having therein particles of electroluminescent phosphor; a pair of electrically conductive layers, one of which is light transmissive, electrically isolated from one another and contacting different surface portions of said dielectric layer; and a pair of flexible electrically insulating layers, one of which is light transmissive, overlying said conductive layers.

5. An electroluminescent cell exhibiting improved maintenance characteristics and comprising; a layer of non-vitreous dielectric material having suspended therein a plurality of discrete spaced glass particles containing particles of an electroluminescent phosphor; a pair of electrically conductive layers, one of which is light transmissive, electrically isolated from one another and contacting different surface portions of said dielectric layer; and a pair of flexible electrically insulating layers, one of which is light-transmissive, overlying said conductive layers.

6. An electroluminescent cell exhibiting improved maintenance characteristics and comprising; a layer of non-vitreous dielectric material having suspended therein a plurality of discrete spaced particles of a low melting point glass containing particles of an electroluminescent phosphor, said glass being one which does not react with the chosen phosphor at temperatures up to the glass melting point; a pair of electrically conductive layers, one of which is light transmissive, electrically isolated from one another and contacting different surface portions of said dielectric layer; and a pair of flexible electrically insulating layers, one of which is light-transmissive, overlying said conductive layers.

7. An electroluminescent cell exhibiting improved maintenance characteristics and comprising; a layer of non-vitreous dielectric material having suspended therein a plurality of discrete spaced glass particles containing particles of an electroluminescent phosphor selected from a group consisting of zinc sulfide, cadmium sulfide, zinc selenide, cadmium selenide, zinc-cadmium sulfide, zinc-cadmium selenide, zinc sulfo-selenide, cadmium sulfo-selenide, zinc-cadmium sulfo-selenide, and zinc oxide activated with a metallic activator selected from the group consisting of copper, manganese, and lead; a pair of electrically conductive layers one of which is light transmissive, electrically isolated from one another and contacting different surface portions of said dielectric layer; and a pair of flexible electrically insulating layers, one of which is light-transmissive, overlying said conductive layers.

8. An electroluminescent cell exhibiting improved maintenance characteristics and comprising; a layer of flexible dielectric material having suspended therein a plurality of discrete spaced glass particles containing particles of electroluminescent phosphor; a pair of electrically conductive layers one of which is light transmissive, electrically isolated from one another and contacting different surface portions of said dielectric layer; an envelope of moisture impervious flexible material enclosing said cell; and a pair of electrical leads extending through said envelope and contacting respectively, said electrically conductive layers.

9. An electroluminescent cell exhibiting improved maintenance characteristics and comprising; a layer of non-vitreous dielectric material having suspended therein a plurality of discrete spaced glass particles of 25 to 100 microns in dimension having therein particles of electroluminescent phosphor; a pair of electrically conductive layers, one of which is light transmissive, electricallly isolated from one another and contacting different surface portions of said dielectric layer; an envelope of moisture impervious material enclosing said cell; and a pair of electrical leads extending through said envelope and contacting, respectively, said electrically conductive layers.

10. An electroluminescent cell exhibiting improved maintenance characteristics and comprising; a layer of non-vitreous dielectric material having suspended therein a plurality of discrete spaced glass particles containing particles of an electroluminescent phosphor; a pair of electrically conductive layers, one of which is light transmissive, electrically isolated from one another and contacting different surface portions of said dielectric layer; an envelope of light transmissive moisture impervious flexible material enclosing said cell; and a pair of electrical leads extending through said envelope and contacting, respectively, said electrically conductive layers.

11. An electroluminescent cell exhibiting improved maintenance characteristics and comprising; a layer of non-vitreous dielectric material having suspended therein a plurality of spaced discrete particles of a low melting point glass containing particles of an electroluminescent phosphor, said glass being one which does not react with the chosen phosphor at temperatures up to the glass melting point; a pair of electrically conductive layers, one of which is light transmissive, electrically isolated from one another and contacting different surface portions of said dielectric layer; an envelope of light transmissive moisture-impervious flexible material enclosing said cell; and a pair of electrical leads extending through said envelope and contacting, respectively, said electrically conductive layers.

12. An electroluminescent cell exhibiting improved maintenance characteristics and comprising; a layer of non-vitreous dielectric material having suspended therein a plurality of discrete spaced glass particles containing particles of an electroluminescent phosphor selected from a group consisting of zinc sulfide, cadmium sulfide, zinc selenide, cadmium selenide, zinc-cadmium sulfide, zinc-cadmium selenide, zinc sulfo-selenide, cadmium sulfo-selenide, zinc-cadmium sulfo-selenide, and zinc oxide activated with a metallic activator selected from the group consisting of copper, manganese, and lead; a pair of electrically conductive layers one of which is light transmissive, electrically isolated from one another and contacting different surface portions of said dielectric layer; an envelope of light transmissive moisture impervious material enclosing said cell; and a pair of electrical leads extending through said envelope and contacting respectively said electrically conductive layers.

13. The method of making an electroluminescent cell which comprises finely grinding particles of an electroluminescent phosphor; finely grinding particles of a low melting point glass which does not react with the electroluminescent phosphor at the melting point of the glass; intermixing the ground glass and the ground phosphor particles; heating the mixed particles to the melting point of the glass to cause the glass to melt, to wet the phosphor, and to form a single molten mass; cooling the molten mass until it becomes solidified; breaking and grinding the solidified mass to form small particles of glass-encapsulated phosphor, suspending the particles in a layer of light transmissive non-vitreous dielectric binder; and contacting the surfaces of the layer with a pair of conducting electrodes, at least one of which is light transmissive.

References Cited in the file of this patent

UNITED STATES PATENTS

| | | |
|---|---|---|
| 2,698,915 | Piper | Jan. 4, 1955 |
| 2,798,823 | Harper | July 9, 1957 |
| 2,866,117 | Walker | Dec. 23, 1958 |